US010124755B2

(12) United States Patent
Kabayama

(10) Patent No.: US 10,124,755 B2
(45) Date of Patent: Nov. 13, 2018

(54) BATTERY-FIXING STRUCTURE

(71) Applicant: HONDA MOTOR CO., LTD., Tokyo (JP)

(72) Inventor: Shohei Kabayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/392,402

(22) Filed: Dec. 28, 2016

(65) Prior Publication Data

US 2017/0197569 A1    Jul. 13, 2017

(30) Foreign Application Priority Data

Jan. 12, 2016 (JP) .................................. 2016-003372

(51) Int. Cl.

| B60R 16/04 | (2006.01) |
|---|---|
| B62D 25/20 | (2006.01) |
| H01M 2/10 | (2006.01) |
| B60K 1/04 | (2006.01) |

(52) U.S. Cl.

CPC ............. B60R 16/04 (2013.01); B62D 25/20 (2013.01); H01M 2/1083 (2013.01); B60K 2001/0416 (2013.01); H01M 2220/20 (2013.01)

(58) Field of Classification Search

CPC ............ B60R 16/04; B60R 2001/0416; B60R 2001/0438; B60R 2001/0466; H01M 2/1083; H01M 2/10; H01M 2220/20; B62D 25/087; B62D 25/20; B62D 25/2027; B62D 25/209

See application file for complete search history.

(56) References Cited

U.S. PATENT DOCUMENTS

| 2,925,137 A | * | 2/1960 | Harper | ..................... B60R 16/04 180/68.5 |
|---|---|---|---|---|
| 2,947,373 A | * | 8/1960 | Wilson | ..................... B60R 16/04 180/68.5 |
| 3,254,736 A | * | 6/1966 | Gass | ........................ B60R 16/04 180/68.5 |

(Continued)

FOREIGN PATENT DOCUMENTS

| DE | 102013202587 A1 * | 8/2013 | ........... B62D 25/087 |
|---|---|---|---|
| JP | 3-256 U | 1/1991 | |

(Continued)

*Primary Examiner* — James A Shriver, II
*Assistant Examiner* — Steve Clemmons
(74) *Attorney, Agent, or Firm* — Westerman, Hattori, Daniels & Adrian, LLP

(57) ABSTRACT

A battery-fixing structure includes a battery-receiving portion provided by depressing downward a floor panel in a rear part of a vehicle body, the battery-receiving portion including a battery-supporting wall member; an upper reinforcing plate having a recess that is depressed downward; and a lower reinforcing plate having a first projection that is raised upward. The battery-supporting wall member is held between the upper reinforcing plate and the lower reinforcing plate. The recess, the battery-supporting wall, and the first projection are joined to one another in such a manner as to overlap one another in a top-bottom direction. A battery is fixed to the upper reinforcing plate with a fixing member.

6 Claims, 5 Drawing Sheets

(56) References Cited

U.S. PATENT DOCUMENTS

| | | | | |
|---|---|---|---|---|
| 5,419,610 | A * | 5/1995 | Enning | B62D 25/087 |
| | | | | 296/193.07 |
| 6,230,834 | B1 * | 5/2001 | Van Hout | B60R 16/04 |
| | | | | 180/68.5 |
| 6,648,090 | B2 * | 11/2003 | Iwase | B60K 1/04 |
| | | | | 180/68.5 |
| 6,905,165 | B2 * | 6/2005 | Kawabe | B62D 21/157 |
| | | | | 296/187.08 |
| 8,110,300 | B2 * | 2/2012 | Niedzwiecki | H01M 2/0245 |
| | | | | 429/100 |
| 9,440,523 | B2 * | 9/2016 | Decker | H01M 2/0237 |
| 9,758,028 | B2 * | 9/2017 | Ikeda | B60K 1/04 |
| 2010/0314905 | A1 * | 12/2010 | Mori | B62D 25/025 |
| | | | | 296/187.03 |
| 2011/0156431 | A1 * | 6/2011 | Souma | B62D 21/152 |
| | | | | 296/37.2 |
| 2012/0103714 | A1 * | 5/2012 | Choi | B60K 1/04 |
| | | | | 180/68.5 |
| 2013/0001986 | A1 * | 1/2013 | Takenaka | B62D 25/087 |
| | | | | 296/193.08 |
| 2014/0020969 | A1 * | 1/2014 | Okada | H01M 2/1072 |
| | | | | 180/68.5 |
| 2015/0180078 | A1 * | 6/2015 | Ikeda | B60L 11/1898 |
| | | | | 180/68.5 |
| 2016/0001721 | A1 * | 1/2016 | Owens | B60R 19/023 |
| | | | | 296/187.03 |
| 2017/0182874 | A1 * | 6/2017 | Shimasaki | B60K 1/04 |

FOREIGN PATENT DOCUMENTS

| | | | |
|---|---|---|---|
| JP | 4029445 B2 | 1/2008 | |
| JP | 4259694 B2 | 4/2009 | |
| JP | 4752482 B2 | 8/2011 | |
| WO | WO-2014061109 A1 * | 4/2014 | B60K 1/04 |

* cited by examiner

BATTERY-FIXING STRUCTURE

CROSS REFERENCES TO RELATED APPLICATIONS

The present application claims priority under 35 U.S.C. § 119 to Japanese Patent Application No. 2016-003372, filed Jan. 12, 2016, entitled "Battery-Fixing Structure." The contents of this application are incorporated herein by reference in their entirety.

TECHNICAL FIELD

The present disclosure relates to a battery-fixing structure in which a battery is fixed to a battery-receiving portion provided by depressing downward a floor panel in a rear part of a vehicle body.

BACKGROUND

A publicly known structure is disclosed by Japanese Patent No. 4029445 in which a space as a downward recess is provided between a vehicle-body frame extending in the front-rear direction and a vehicle-body side wall, and a battery placed in the space is held from above with a fixing member that bridges the vehicle-body frame and the vehicle-body side wall, whereby the battery is fixed.

Another publicly known structure is disclosed by Japanese Patent No. 4752482 in which a downward recess is provided in a rear floor pan surrounded by right and left rear side frames, a rear crossmember connecting front parts of the right and left rear side frames, and a rear end crossmember connecting rear parts of the right and left rear side frames; and a battery placed in the recess is held from above with a bridging member that bridges the rear crossmember and the rear end crossmember, whereby the battery is fixed.

Yet another publicly known structure is disclosed by Japanese Unexamined Utility Model Registration Application Publication No. 3-256 in which a battery is fixed to an upper surface of a floor panel that covers a rear frame from above, and the weight of the battery is borne by the rear frame.

Yet another publicly known structure is disclosed by Japanese Patent No. 4259694 in which a battery is fixed to an upper surface of a floor panel that covers a crossmember from above, and the weight of the battery is borne by the crossmember.

SUMMARY

According to the present inventor's study, in each of the above structures, since the battery is fixed by using a vehicle-body frame, the position where the battery is allowed to be placed is limited, lowering the flexibility in design. To avoid such a situation, the battery may be fixed to, with no aid of the vehicle-body frame, a battery-receiving portion provided by depressing downward a floor panel in a rear part of the vehicle body. However, the floor panel has a lower strength than the vehicle-body frame and might not be able to rigidly support the battery.

In view of the above, the present application describes, for example, a light-weight structure that allows a floor panel to rigidly support a battery with no aid of a vehicle-body frame.

According to a first aspect of the embodiment, a battery-fixing structure includes a battery-receiving portion provided by depressing downward a floor panel in a rear part of a vehicle body, the battery-receiving portion including a battery-supporting wall member; an upper reinforcing plate having a recess that is depressed downward; and a lower reinforcing plate having a first projection that is raised upward. The battery-supporting wall member is held between the upper reinforcing plate and the lower reinforcing plate. The recess, the battery-supporting wall, and the first projection are joined to one another in such a manner as to overlap one another in a top-bottom direction. A battery is fixed to the upper reinforcing plate with a fixing member. Therefore, the battery as a heavy object is supported rigidly by a light-weight structure that does not include the vehicle-body frame. Moreover, since the battery-receiving portion is reinforced by the upper reinforcing plate and the lower reinforcing plate, the rigidity of the rear part of the vehicle body is increased.

According to a second aspect of the embodiment, the battery-receiving portion may further include a pair of side walls extending upward from two respective ends, in a body-width direction, of a bottom wall of the battery-supporting wall member and being continuous with the floor panel. Furthermore, the recess may have a furrow-like shape, the first projection may have a channel-like shape, and the recess and the first projection may each extend in the body-width direction. Therefore, the weight of the battery is borne while being efficiently transmitted from the battery-supporting wall member to the side walls and then to the floor panel.

According to a third aspect of the embodiment, the battery-supporting wall member may further include a front wall extending upward from a front end of the bottom wall, and an inclined wall extending from a rear end of the bottom wall toward an upper rear. Furthermore, the lower reinforcing plate may include a plurality of second projections each having a channel-like shape that is raised upward and extending in a front-rear direction. Furthermore, the recess, the inclined wall, and each of the second projections may be joined to one another in such a manner as to overlap one another in the top-bottom direction. Furthermore, a towing hook may be fixed to a position near a bead provided between adjacent ones of the second projections and extending in the front-rear direction. Therefore, the load applied from the towing hook to the lower reinforcing plate when the vehicle is towed is distributed between the inclined wall of the battery-supporting wall member and the upper reinforcing plate. Thus, the battery is supported rigidly.

According to a fourth aspect of the embodiment, a front end of the upper reinforcing plate may be joined to a rear surface of the front wall. Furthermore, a space having a closed sectional shape may be provided at a corner between the front wall and the bottom wall and below the upper reinforcing plate. Therefore, the strength of the battery-receiving portion is increased more effectively.

According to a fifth aspect of the embodiment, a front end of the lower reinforcing plate may be joined to a front surface of the front wall. Furthermore, a space having a closed sectional shape may be provided at a corner between the front wall and the bottom wall and above the lower reinforcing plate. Therefore, the strength of the battery-receiving portion is increased more effectively.

For example, the trunk floor panel 16 according to the embodiment corresponds to the floor panel according to the present disclosure. The recesses 19b according to the embodiment each correspond to the recess according to the present disclosure. The projections 21c according to the embodiment each correspond to the first projection according to the present disclosure. The fixing rods 23 and the retaining plate 24 according to the embodiment each correspond to the fixing member according to the present disclosure.

BRIEF DESCRIPTION OF THE DRAWINGS

The advantages of the disclosure will become apparent in the following description taken in conjunction with the following drawings.

DETAILED DESCRIPTION

An embodiment of the disclosure will now be described with reference to FIGS. 1 to 5. Herein, the front-rear direction, the left-right direction (the body-width direction), and the top-bottom direction are defined with reference to the occupant seated in the driver's seat.

Figure 1:
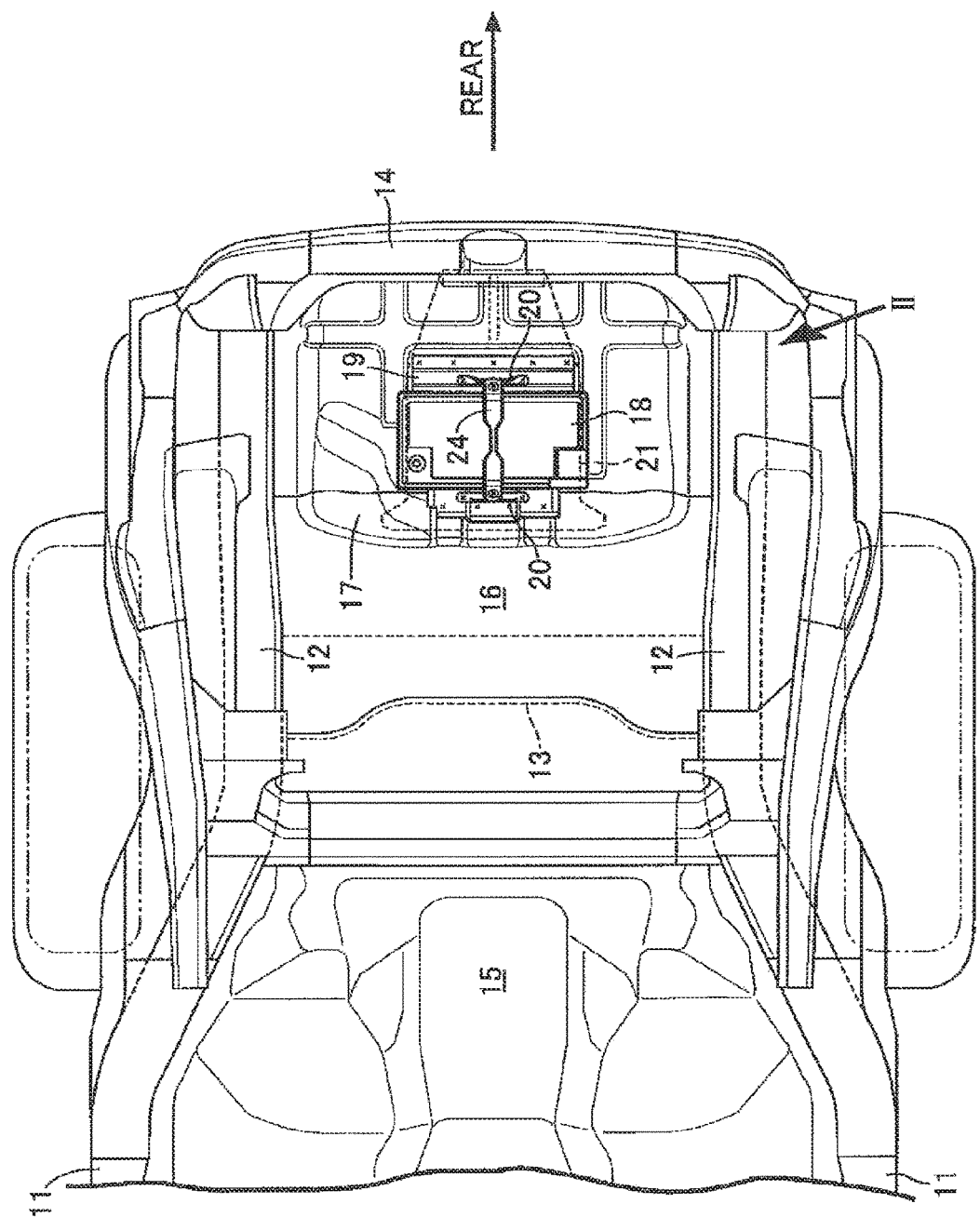
FIG. 1 is a top view of a rear part of a vehicle body.
Figure 2:
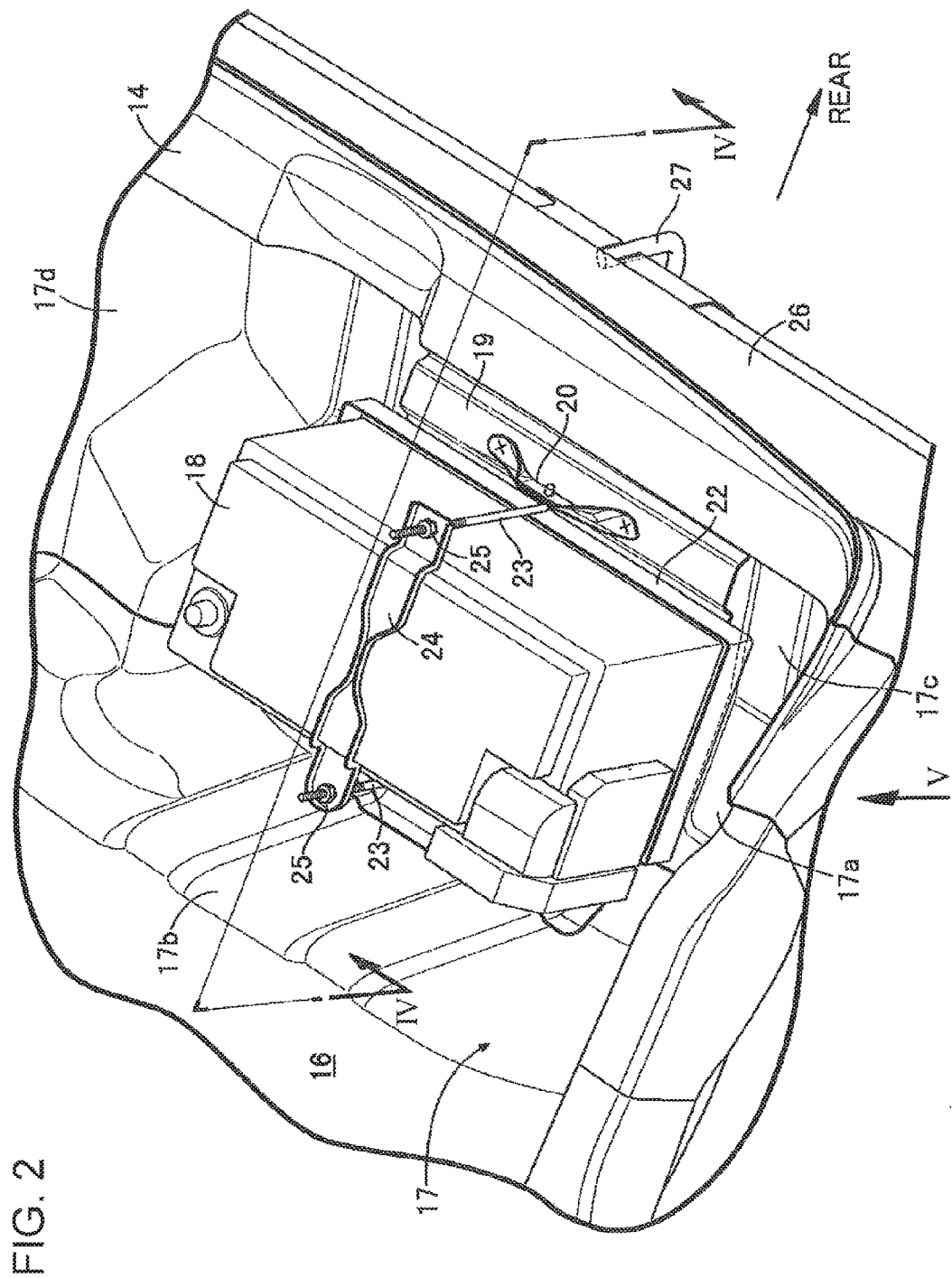
FIG. 2 illustrates the rear part of the vehicle body that is seen in a direction of arrow II illustrated in FIG. 1.
Figure 3:
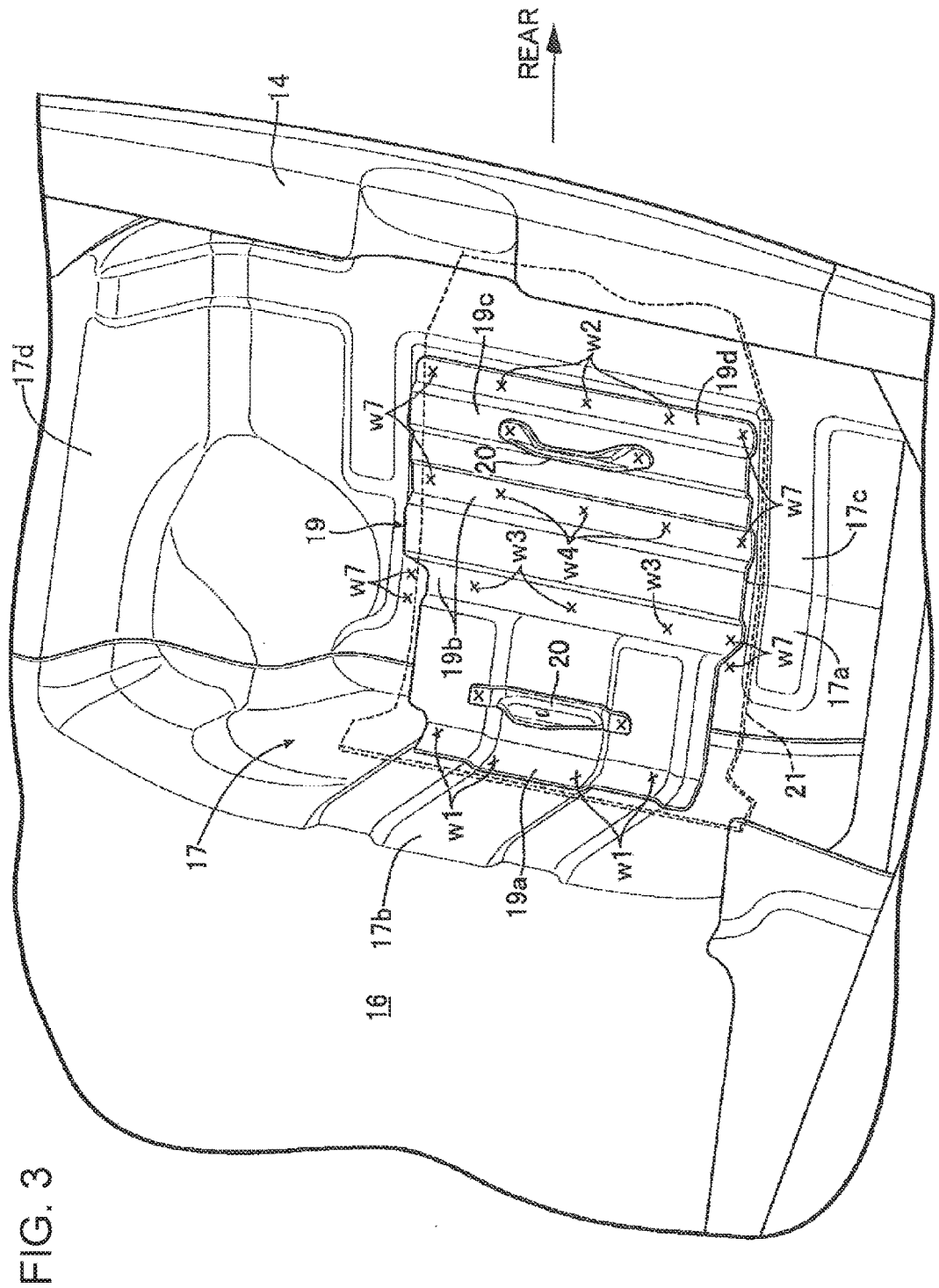
FIG. 3 illustrates the rear part of the vehicle body illustrated in FIG. 2, with a battery removed.
Figure 4:
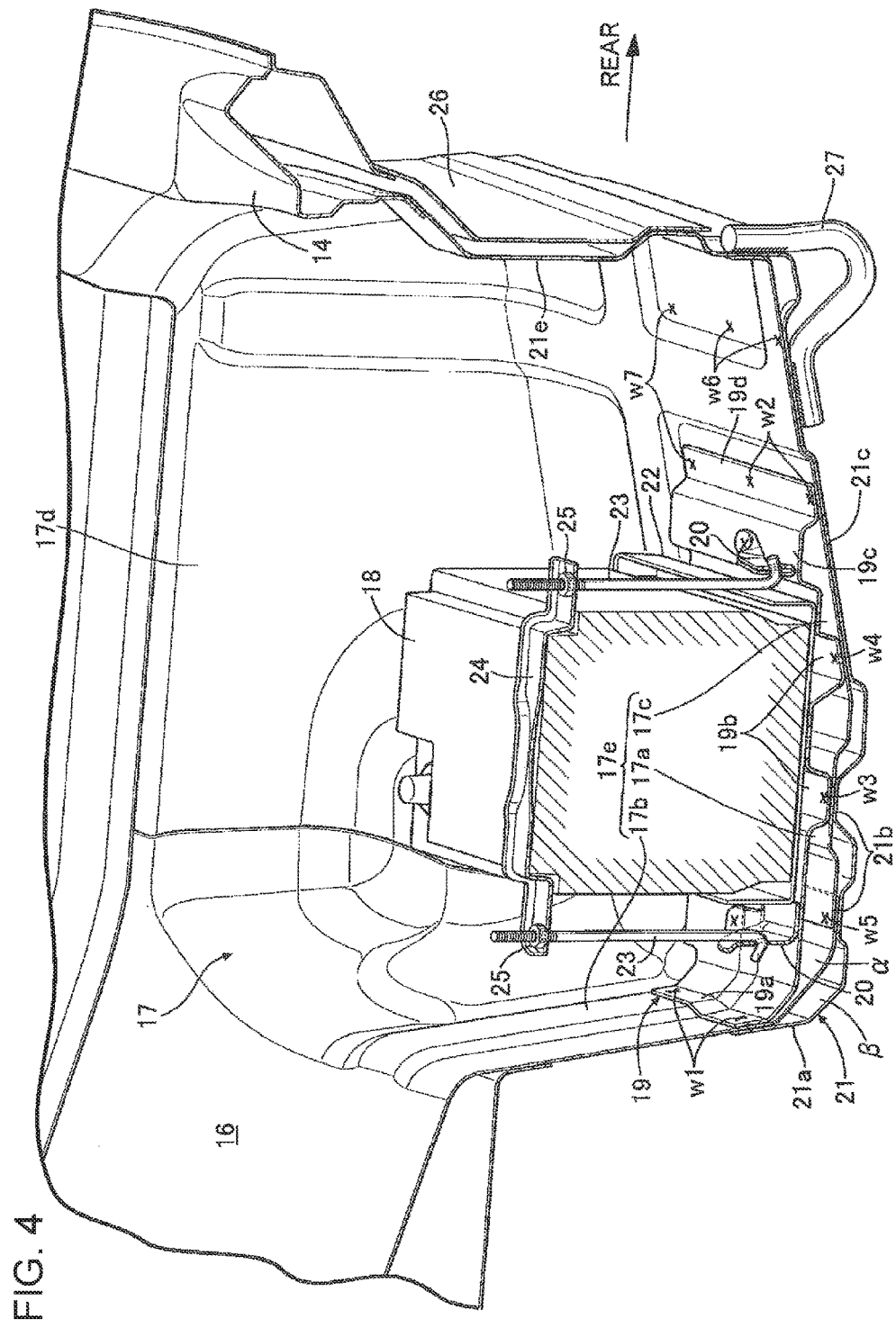
FIG. 4 is a sectional view of the rear part of the vehicle body that is taken along line IV-IV illustrated in FIG. 2.
Figure 5:
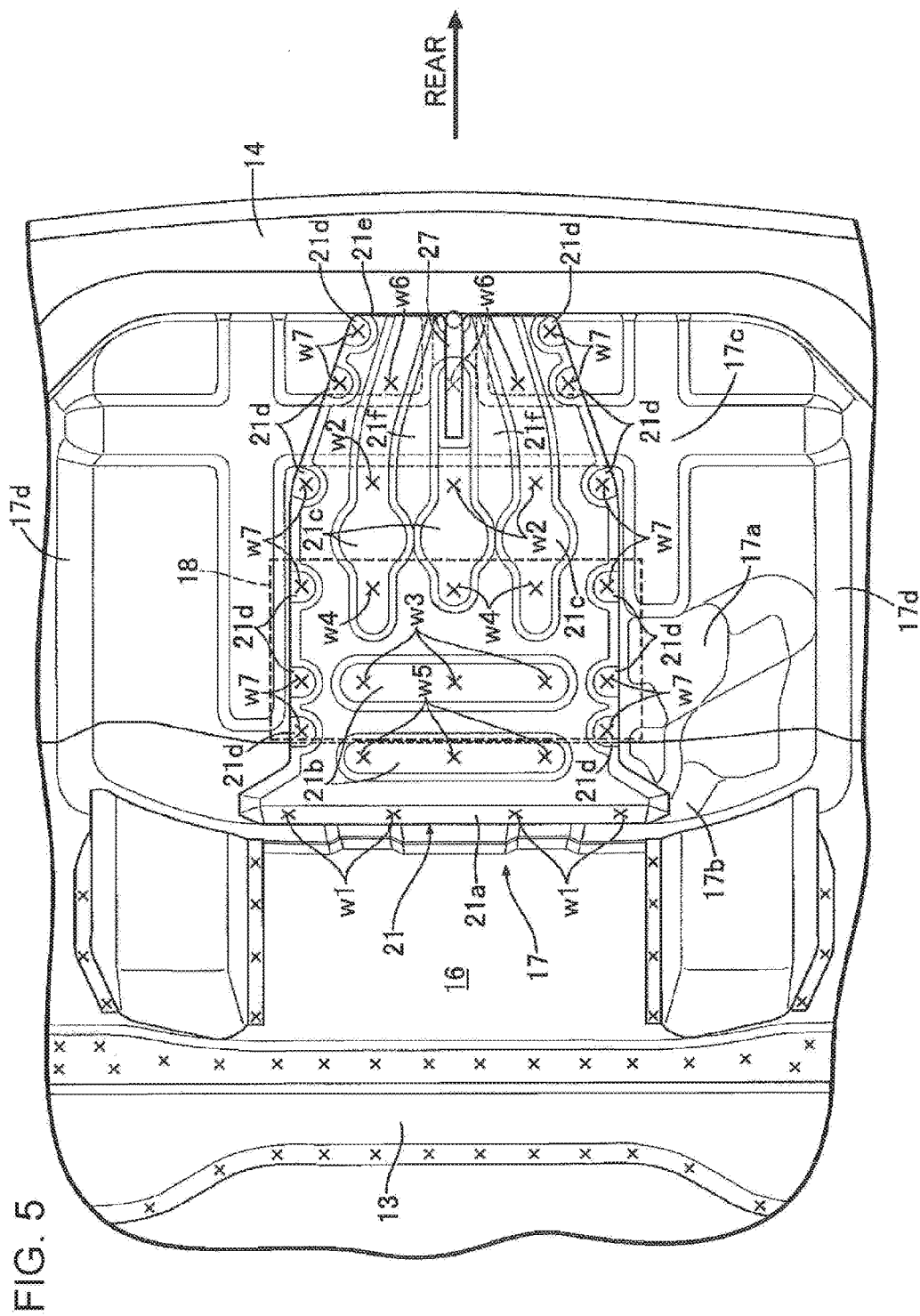
FIG. 5 illustrates the rear part of the vehicle body that is seen in a direction of arrow V illustrated in FIG. 2.

Referring to FIG. 1, a pair of right and left side sills 11 extend in the front-rear direction along right and left sides, respectively, of a vehicle. A pair of right and left rear side frames 12 extending in the front-rear direction are connected, at the front ends thereof, to the rear ends of the respective side sills 11. The right and left rear side frames 12 are connected to each other at respective parts thereof in the middle in the front-rear direction by a rear crossmember 13 extending in the body-width direction. The right and left rear side frames 12 are also connected to each other at respective upper parts of the rear ends thereof by a rear end crossmember 14 extending in the body-width direction. The right and left rear side frames 12 are also connected to each other at respective parts thereof that are on the front side with respect to the rear crossmember 13 by a rear floor panel 15. The right and left rear side frames 12 are also connected to each other at respective parts thereof that are on the rear side with respect to the rear crossmember 13 by a trunk floor panel 16. The trunk floor panel 16 has, in a rear part thereof, a battery-receiving portion 17 provided in the form of a downward recess. A battery 18 having a rectangular parallelepiped shape and that supplies power to electric devices of the vehicle is fixed to the battery-receiving portion 17.

Referring to FIGS. 2 to 5, the battery-receiving portion 17 includes a bottom wall 17a extending substantially horizontally, a front wall 17b extending upward from the front end of the bottom wall 17a and connected to the trunk floor panel 16, an inclined wall 17c extending obliquely from the rear end of the bottom wall 17a toward the upper rear, and right and left side walls 17d each extending upward in such a manner as to be connected to, at a corresponding one of two ends in the body-width direction, the bottom wall 17a, the front wall 17b, and the inclined wall 17c. The upper ends of the side walls 17d are connected to the trunk floor panel 16. The bottom wall 17a, the front wall 17b, and the inclined wall 17c of the battery-receiving portion 17 together form a battery-supporting wall member 17e (see FIG. 4) that supports the battery 18.

The upper surface of the battery-supporting wall member 17e is reinforced by an upper reinforcing plate 19. The upper reinforcing plate 19 includes a front fixed portion 19a provided by folding the front end thereof upward along a line extending in the body-width direction, two furrow-type recesses 19b provided by depressing downward two parts thereof in the middle in the front-rear direction in such a manner as to extend in the body-width direction, a channel-type projection 19c provided by raising upward a part thereof on the rear side with respect to the rear one of the recesses 19b in such a manner as to extend in the body-width direction, and a rear fixed portion 19d provided on the rear side with respect to the projection 19c and extending in the body-width direction. The two recesses 19b are each regarded as the recess according to the present disclosure. A pair of front and rear battery-supporting brackets 20 are welded to the upper surface of the upper reinforcing plate 19.

The lower surface of the battery-supporting wall member 17e is reinforced by a lower reinforcing plate 21. The lower reinforcing plate 21 includes a front fixed portion 21a provided by folding the front end thereof upward along a line extending in the body-width direction, two channel-type projections 21b provided by raising upward two parts thereof in the middle in the front-rear direction in such a manner as to extend in the body-width direction, three channel-type projections 21c provided by raising upward three parts thereof on the rear side with respect to the rear one of the projections 21b in such a manner as to each extend in the front-rear direction, and a plurality of side fixed portions 21d dispersedly provided along the two sides thereof in the body-width direction. The rear one of the two projections 21b is regarded as the first projection according to the present disclosure. The three projections 21c are each regarded as the second projection according to the present disclosure. The lower reinforcing plate 21 further includes a rear wall 21e (see FIG. 4) extending upward at the rear end thereof. The rear wall 21e forms a rear wall of the battery-receiving portion 17.

Three layers including the front wall 17b of the battery-supporting wall member 17e, the front fixed portion 19a of the upper reinforcing plate 19 that faces the rear surface of the front wall 17b, and the front fixed portion 21a of the lower reinforcing plate 21 that faces the front surface of the front wall 17b are welded to one another at welded points w1. Three layers including the inclined wall 17c of the battery-supporting wall member 17e, the rear fixed portion 19d of the upper reinforcing plate 19 that faces the upper surface of the inclined wall 17c, and each of front-rear-direction middle parts of the three channel-type projections 21c of the lower reinforcing plate 21 that face the lower surface of the inclined wall 17c are welded to one another at welded points w2. Three layers including the bottom wall 17a of the battery-supporting wall member 17e, the front one of the recesses 19b of the upper reinforcing plate 19 that faces the upper surface of the bottom wall 17a, and the rear one of the projections 21b of the lower reinforcing plate 21 that faces the lower surface of the bottom wall 17a are welded to one another at welded points w3. Three layers including the inclined wall 17c of the battery-supporting wall member 17e, the rear one of the recesses 19b of the upper reinforcing plate 19 that faces the upper surface of the inclined wall 17c, and each of front parts of the three projections 21c of the lower reinforcing plate 21 that face the lower surface of the inclined wall 17c are welded to one another at welded points w4.

Two layers including the bottom wall 17a of the battery-supporting wall member 17e and the front one of the projections 21b of the lower reinforcing plate 21 that faces the lower surface of the bottom wall 17a are welded to each other at welded points w5. Two layers including the inclined wall 17c of the battery-supporting wall member 17e and each of rear parts of the three projections 21c of the lower reinforcing plate 21 are welded to each other at welded points w6. Three layers including each of the bottom wall 17a and the inclined wall 17c of the battery-supporting wall member 17e, each of the two body-width-direction sides of the upper reinforcing plate 19 that faces the upper surfaces of the bottom wall 17a and the inclined wall 17c, and each of the side fixed portions 21d of the lower reinforcing plate 21 that face the lower surfaces of the bottom wall 17a and the inclined wall 17c are welded to one another at welded points w7. Alternatively, only two layers including each of the bottom wall 17a and the inclined wall 17c and each of the side fixed portions 21d may be welded to each other at the welded points w7.

When the upper reinforcing plate 19 and the lower reinforcing plate 21 are welded to the upper and lower surfaces, respectively, of the battery-supporting wall member 17e of the battery-receiving portion 17 at the welded points w1 to w7 as described above, a space $\alpha$ (see FIG. 4) having a closed sectional shape and extending in the body-width direction is provided at a corner of the battery-supporting wall member 17e below the lower end of the front fixed portion 19a of the upper reinforcing plate 19, and a space $\beta$ (see FIG. 4) having a closed sectional shape and extending in the body-width direction is provided at the corner of the battery-supporting wall member 17e above the lower end of the front fixed portion 21a of the lower reinforcing plate 21.

The battery 18 having a rectangular parallelepiped shape is placed on a tray 22 provided on the upper surface of the upper reinforcing plate 19 and is detachably fixed to the upper reinforcing plate 19, with the long sides of the battery 18 extending in the body-width direction.

Specifically, J-shaped fixing rods 23 each have a bent lower end, and the lower end is hooked into a receiving hole provided in a corresponding one of the pair of front and rear battery-supporting brackets 20 that are welded to the upper reinforcing plate 19. The upper ends of the respective fixing rods 23 extend through the front and rear ends, respectively, of a retaining plate 24 that is in contact with the upper surface of the battery 18. Nuts 25 are screwed onto the upper ends of the respective fixing rods 23. Thus, the battery 18 and the tray 22 are pressed against and fixed to the upper reinforcing plate 19.

A rear end plate 26 (see FIG. 4) is provided over the rear surface of the rear wall 21e of the lower reinforcing plate 21. The upper end of the rear wall 21e and the upper end of the rear end plate 26 are connected to the rear end crossmember 14. A towing hook 27 in the form of a bent bar extends from the lower surface of a rear part of the lower reinforcing plate 21 to the rear wall 21e. The front part of the towing hook 27 is welded to a position between two beads 21f each provided between adjacent ones of the three projections 21c of the lower reinforcing plate 21 that extend in the front-rear direction (see FIG. 5). The rear part of the towing hook 27 is welded to the rear surface of the rear wall 21e of the lower reinforcing plate 21 (see FIG. 4).

Now, functions exerted by the above embodiment of the disclosure will be described.

To place the battery 18, which is a heavy object, into the battery-receiving portion 17 provided by depressing the trunk floor panel 16 downward, the battery-supporting wall member 17e of the battery-receiving portion 17 is reinforced by the upper reinforcing plate 19 and the lower reinforcing plate 21 from the upper and lower sides, respectively, thereof. Thus, the strength of the battery-supporting wall member 17e is increased, and the battery 18 is supported rigidly.

Especially, the front one of the furrow-type recesses 19b of the upper reinforcing plate 19 that are depressed downward while extending in the body-width direction and the rear one of the channel-type projections 21b of the lower reinforcing plate 21 that are raised upward while extending in the body-width direction are welded to the upper and lower surfaces, respectively, of the battery-supporting wall member 17e of the battery-receiving portion 17 at the welded points w3 in such a manner as to overlap each other in the top-bottom direction. Then, the battery 18 is fixed to the upper surface of the upper reinforcing plate 19 with the fixing rods 23 and the retaining plate 24. Therefore, the battery 18 as a heavy object is supported rigidly by a light-weight structure that does not include the vehicle-body frame. Moreover, since the battery-receiving portion 17 is reinforced by the upper reinforcing plate 19 and the lower reinforcing plate 21, the rigidity of the rear part of the vehicle body is increased.

The battery-receiving portion 17 includes the pair of side walls 17d extending upward from the two respective ends, in the body-width direction, of the battery-supporting wall member 17e. Furthermore, the furrow-type recesses 19b of the upper reinforcing plate 19 and the channel-type projections 21b of the lower reinforcing plate 21 extend in the body-width direction. Therefore, the weight of the battery 18 can be borne while being efficiently transmitted from the battery-supporting wall member 17e to the side walls 17d and then to the trunk floor panel 16.

Furthermore, the space $\alpha$ having a closed sectional shape is provided at the corner between the front wall 17b and the bottom wall 17a of the battery-supporting wall member 17e of the battery-receiving portion 17 and below the upper reinforcing plate 19, and the space $\beta$ having a closed sectional shape is provided at the above corner and above the lower reinforcing plate 21. Therefore, the strength of the battery-receiving portion 17 is increased more effectively.

Furthermore, the rear one of the furrow-type recesses 19b of the upper reinforcing plate 19 that extend in the body-width direction and each of the three channel-type projections 21c of the lower reinforcing plate 21 that extend in the front-rear direction are welded to the upper and lower surfaces of the inclined wall 17c of the battery-supporting wall member 17e of the battery-receiving portion 17 at the welded points w4 in such a manner as to overlap each other. Hence, the strength of the inclined wall 17c of the battery-supporting wall member 17e is increased. Moreover, the strength at the rear part of the inclined wall 17c is further increased by the three channel-type projections 21c welded thereto at the welded points w6. Furthermore, the towing hook 27 is welded to the position between the two beads 21f each extending between adjacent ones of the three channel-type projections 21c. Therefore, the load applied from the towing hook 27 to the lower reinforcing plate 21 when the vehicle is towed is distributed between the inclined wall 17c of the battery-supporting wall member 17e and the upper reinforcing plate 19. Thus, the battery 18 is supported rigidly.

While a specific embodiment of the present disclosure has been described above, various design changes can be made to the embodiment without departing from the spirit of the disclosure.

For example, the numbers of recesses 19b and projections 19c of the upper reinforcing plate 19 and the numbers of projections 21b and projections 21c of the lower reinforcing plate 21 are not limited to those defined in the above embodiment and may be changed according to need. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A battery-fixing structure comprising:
    a battery-receiving portion having a depressed recess shape provided by depressing downward a floor panel disposed in a rear part of a vehicle body, the battery-receiving portion including a battery-supporting wall member comprising a bottom wall, a front wall extending upward from a front end of the bottom wall to have a corner portion between the bottom wall and the front wall;
    an upper reinforcing plate having a channel-shaped recess that is depressed downward,
    wherein the upper reinforcing plate includes a front end portion being joined to a rear face of the front wall of the battery-supporting wall member in such a manner as to overlap one another in a front-rear direction,
    wherein the channel-shaped recess of the upper reinforcing plate is disposed at a rear of the front end portion of the upper reinforcing plate, and
    the channel-shaped recess of the upper reinforcing plate is joined to the bottom wall of the battery-supporting wall member in such a manner as to overlap one another in a top-bottom direction such that a space having a closed sectional shape is provided between the upper reinforcing plate and the battery-supporting wall member at the corner portion between the bottom wall and the front wall, and
    wherein a battery is fixed to the upper reinforcing plate with a fixing member at a position right above the corner portion between the bottom wall and the front wall.

2. The battery-fixing structure according to claim 1, wherein
    the battery-receiving portion further includes a pair of side walls extending upward from two respective ends, in a vehicle-body-width direction, of the bottom wall to continue to the floor panel, and
    wherein the channel-shaped recess extends in the vehicle-body-width direction.

3. The battery-fixing structure according to claim 2,
    wherein the battery-supporting wall member further includes:
        an inclined wall extending from a rear end of the bottom wall toward an upper rear,
    wherein the channel-shaped recess and the inclined wall are joined to one another in such a manner as to overlap one another in the top-bottom direction.

4. The battery-fixing structure according to claim 1,
    wherein the battery-receiving portion is disposed between right and left rear side frames, each extending in a front-rear direction.

5. The battery-fixing structure according to claim 1,
    wherein the upper reinforcing plate is provided to an upper surface of the battery-supporting wall member.

6. A vehicle comprising the battery-fixing structure according to claim 1.

* * * * *